US006638659B1

(12) United States Patent
Fenton et al.

(10) Patent No.: US 6,638,659 B1
(45) Date of Patent: *Oct. 28, 2003

(54) MEMBRANE ELECTRODE ASSEMBLIES USING IONIC COMPOSITE MEMBRANES

(75) Inventors: James M. Fenton, Tolland, CT (US); H. Russell Kunz, Vernon, CT (US); Jung-Chou Lin, Storrs, CT (US)

(73) Assignee: University of Connecticut, Farmington, CT (US)

( * ) Notice: Subject to any disclaimer, the term of this patent is extended or adjusted under 35 U.S.C. 154(b) by 148 days.

This patent is subject to a terminal disclaimer.

(21) Appl. No.: 09/660,028

(22) Filed: Sep. 12, 2000

Related U.S. Application Data

(63) Continuation-in-part of application No. 09/562,235, filed on Apr. 28, 2000, now Pat. No. 6,465,136.
(60) Provisional application No. 60/132,038, filed on Apr. 30, 1999.

(51) Int. Cl.[7] .................................................. H01M 4/86
(52) U.S. Cl. ............................ 429/40; 429/30; 429/33; 429/46; 429/304; 429/306; 429/309
(58) Field of Search ........................ 429/30, 33, 46, 429/40, 304, 306, 309

(56) References Cited

U.S. PATENT DOCUMENTS

| 3,266,940 A | 8/1966 | Caesar |
| 4,073,752 A | 2/1978 | Ramp |
| 4,724,191 A | 2/1988 | Kuriakose et al. |
| 4,990,413 A | 2/1991 | Lee et al. |
| 5,082,472 A | 1/1992 | Mallouk et al. |
| 5,094,895 A | 3/1992 | Branca et al. |
| 5,183,545 A | 2/1993 | Branca et al. |
| 5,211,984 A | 5/1993 | Wilson |
| 5,234,777 A | 8/1993 | Wilson |
| 5,330,860 A | 7/1994 | Grot et al. |
| 5,401,408 A | 3/1995 | Umemura et al. |

(List continued on next page.)

FOREIGN PATENT DOCUMENTS

| GB | 1523259 | 3/1976 |
| JP | 61 067789 A | 4/1986 |
| JP | 62-240627 | 10/1986 |
| JP | 62-280230 | 12/1987 |
| JP | 62-280231 | 12/1987 |
| WO | WO96/29752 | 9/1996 |

OTHER PUBLICATIONS

Lin, J.C. et al., 1999, "Preparation of High Temperature Composite Membranes for Hydrogen Proton Exchange Membrane Fuel Cell", Hazardous and Industrial Wastes; Proceedings of the 31st Mid–Atlantic Industrial and Hazardous Waste Conference, Technomic Publishing Co., Inc., Lancaster, PA, 663, 1999.

(List continued on next page.)

Primary Examiner—Carol Chaney
Assistant Examiner—Dah-Wei D. Yuan
(74) Attorney, Agent, or Firm—Edwards & Angell LLP

(57) ABSTRACT

A membrane electrode assembly comprising a composite membrane having a first major surface area and a second major surface area comprising a porous polymeric matrix containing ionically conductive solid and ionomeric binder, at least one protective layer disposed adjacent to the porous polymeric matrix membrane comprising an ionomeric binder and an ionically conductive solid, an anode comprising an oxidizing catalyst adjacent said first major surface area of said composite membrane and a cathode comprising a reducing catalyst adjacent said second major surface area of said composite membrane, and a method for manufacturing the same.

6 Claims, 7 Drawing Sheets

U.S. PATENT DOCUMENTS

| | | | | |
|---|---|---|---|---|
| 5,547,551 A | | 8/1996 | Bahar et al. | |
| 5,599,638 A | * | 2/1997 | Surampudi et al. | 429/33 |
| 5,919,583 A | | 7/1999 | Grot et al. | |
| 6,106,963 A | * | 8/2000 | Nitta et al. | 429/19 |
| 6,232,010 B1 | * | 5/2001 | Cisar et al. | 429/40 |
| 6,410,180 B1 | * | 6/2002 | Cisar et al. | 429/41 |
| 6,465,136 B1 | * | 10/2002 | Fenton et al. | 429/309 |

OTHER PUBLICATIONS

Malhotra, s. et al., "Membrane–Supported Nonvolatile Acidic Electrolytes Allow Higher Temperature Operation of Proton Exchange Membrane Fuel Cells", Journal of the Electrochemical Society, vol. 144, No. 2, L23–L26, 1997.

* cited by examiner

MEMBRANE ELECTRODE ASSEMBLIES USING IONIC COMPOSITE MEMBRANES

CROSS-REFERENCE TO RELATED APPLICATIONS

This application is a continuation-in-part application of U.S. patent application Ser. No. 09/562,235, filed Apr. 28, 2000, now U.S. Pat. No. 6,465,136, which claims priority from U.S. Provisional Application No. 60/132,038, filed Apr. 30, 1999 the disclosures of which are hereby incorporated in their entirety.

BACKGROUND OF THE INVENTION

1. Field of the Invention

The present invention relates to novel membrane electrode assemblies, improved membranes for use in such membrane electrode assemblies, and fuel cells employing such membrane electrode assemblies.

2. Brief Description of the Related Art

Fuel cells are electrochemical cells in which a free energy change resulting from a fuel oxidation reaction is converted into electrical energy. Fuel cells are attractive electrical power sources, due to their higher energy efficiency and environmental compatibility compared to the internal combustion engine. The most well-known fuel cells are those using a gaseous fuel (such as hydrogen) with a gaseous oxidant (usually pure oxygen or atmospheric oxygen), and those fuel cells using direct feed organic fuels such as methanol. In contrast to batteries, which must be recharged, electrical energy from fuel cells can be produced for as long as the fuels, e.g., methanol or hydrogen, and oxidant, are supplied. Thus, a considerable interest exists in the design of improved fuel cells to fill future energy needs.

While a number of different types of electrochemical cells have been employed in the manufacture of fuel cells, arguably ion exchange membrane (IEM) cells have received the most attention. An IEM cell typically employs a membrane comprising an ion-exchange polymer. This ion-exchange polymer membrane serves as a physical separator between the anode and cathode, while also serving as an electrolyte. IEM cells can be operated as electrolytic cells for the production of electrochemical products, or operated as fuel cells for the production of electrical energy.

In some IEM cells, a cation exchange membrane is used wherein protons are transported across the membrane as the cell is operated. Such cells are often referred to as proton exchange membrane (PEM) cells. For example, in a cell employing the hydrogen/oxygen couple, hydrogen molecules (fuel) at the anode are oxidized donating electrons to the anode, while at the cathode the oxygen (oxidant) is reduced accepting electrons from the cathode. The $H^+$ ions (protons) formed at the anode migrate through the membrane to the cathode and combine with oxygen to form water. In many fuel cells, the anode and/or cathode comprises a layer of electrically conductive, catalytically active particles (usually in a polymeric binder) on the proton exchange membrane. The resulting structure (sometimes also including current collectors) is referred to as a membrane electrode assembly (MEA).

In one approach to the construction of an ion exchange membrane, perfluornated sulfonic acid polymers such as Nafion® (and other ion exchange materials) are incorporated into films, for example porous polytetrafluoroethylene (PTFE), to form composite membranes,:as described for example in U.S. Pat. No. 5,082,472, to Mallouk, et al.; JP Laid-Open Pat. Application Nos. 62-240627, 62-280230, and 62-280231; U.S. Pat. No. 5,094,895 to Branca, U.S. Pat. No. 5,183,545 to Branca et al.; and U.S. Pat. No. 5,547,551 to Bahar, et al. (each of the foregoing references being incorporated herein in their entirety).

In another approach to construction of an ion exchange membrane, a composite membrane is prepared, for example, by precipitation of a water-insoluble, inorganic conductor such as zirconium hydrogen phosphate into a porous Nafion® membrane (See,. e.g., CT/US96/03804 to Grot, et al.). or incorporation of phosphotungstic acid into a Nafion® membrane (See, e.g.,., S. Malhotra, et al., in "Journal of the Electrochemical Society," Vol. 144, No. 2, L23–L26, 1997—although the resulting membrane was said to demonstrate high conductivity at elevated temperature, the composite membrane lacked sufficient strength at reduced thickness for hydrogen fuel cell applications).

Fuel cells that employ IEMs and direct organic fuels such as methanol frequently suffer from so-called "crossover" of fuel through the membrane. The term "crossover" refers to the undesirable transport of fuel through the membrane from the fuel electrode, or anode, side to the oxygen electrode, or cathode side of the fuel cell. After having been transported across the membrane, the fuel will either evaporate into the circulating oxygen stream or react with the oxygen at the oxygen electrode. Fuel crossover diminishes cell performance for two primary reasons. Firstly, the transported fuel cannot react electrochemically to produce useful energy, and therefore contributes directly to a loss of fuel efficiency (effectively a fuel leak). Secondly, the transported fuel interacts with the cathode, i.e., the oxygen electrode, and lowers its operating potential and hence the overall cell voltage. The reduction of cell voltage lowers specific cell power output, and also reduces the overall efficiency.

Fuel cells that employ IEMs and hydrogen as a fuel also suffer from disadvantages. Certainly, the difficulty of on-board storage and refueling of hydrogen is a major concern in the application of hydrogen fuel cells in vehicles. One approach for surmounting this obstacle has been to utilize the hydrogen fuel obtained through steam reforming of gasoline. Unfortunately, hydrogen fuel from steam reforming of gasoline usually contains a trace amount of carbon monoxide, which results in severe poisoning of anode catalysts. Operating the fuel cell at high temperature can effectively alleviate the carbon monoxide poisoning of anode catalysts. However, at elevated temperature, membranes comprising perfluorinated sulfonic acid polymers such a Nafion® quickly lose ionic conductivity at ambient pressure due to dehydration. Operation at high temperatures with such membranes thus requires that the cells be pressurized.

One particularly useful group of cation-exchange membrane materials for PEM cells is perfluorinated sulfonic acid polymers such as Nafion®, available from E.I. duPont de Nemours & Co. Such cation-exchange polymers have good conductivity and chemical and thermal resistance, which provide long service life before replacement. However, increased proton conductivity is desired for some applications, particularly for fuel cells, which operate at high current densities.

PEMs must have enough strength, minimum fuel crossover, and high ionic conductance at elevated temperature to be useful in fuel cell applications using hydrogen fuel from partial oxidation or steam reforming of hydrocarbons or other sources. Membrane thickness has been reduced in an effort to improve conductance. However, reduction in thickness results in insufficient membrane strength, necessitating use of additional reinforcing materials, and an increase in crossover. For example, pure Nafion® membranes have not provided sufficient strength at reduced thicknesses. To increase the strength additional reinforced materials are needed.

PEMS also require effective catalysts associated with the membranes to provide for reactivity with the fuel source and resulting products of catalysis. Typically, a catalyst layer is applied to the membrane using, for example, a combination of temperature, pressure, and perhaps an adhesive. Such layered structure may be placed between two porous substrates.

Most recently, an alternative low-platinum-loading catalyst layer structure has been developed by Wilson at LANL (M. S. Wilson, U.S. Pat. Nos., 5,211,984 and 5,234,777 (1993)) and Grot (U.S. Pat. 5,330,860) to make membrane electrode assemblies. In this structure, recast ionomer (Nafion®) is used instead of PTFE to bind the catalyst layer structure together, and the low-loading catalyst layer is applied to the membrane, rather than to the gas diffusion structure. Such (PTFE-free) layers have been described as "thin-film" catalyst layers, because the high performance is obtained with a very low catalyst loading (0.12–0.16 mg Pt/cm$^2$) in a thin layer (<10 $\mu$m thick). By virtue of their thinness and the high ionomer contents achievable with these catalyst layers, high catalyst utilizations are obtained and the continuity and integrity of the catalyst layer/membrane interface is greatly improved compared with the structures prepared by hot pressing catalysts that are bonded to the gas diffusion layers on to the membrane.

There accordingly remains a need for a membrane capable of maintaining high conductivity at elevated temperature, and which will enable use of PEM fuel cells for vehicle applications. There remains a further need for a membrane that maintains functionality in methanol/hydrogen fuel cells in particular when the fuel contains trace carbon monoxide, as for example, produced during a steam reforming process. There remains a further need for a membrane that operates at a temperature high enough to boil water for use in fuel processing and provide high quality waste heat for on-site space heating use. There further remains a need for a membrane exhibiting sufficient strength at reduced thicknesses, high conductance at elevated temperature, and minimum fuel crossover for hydrogen fuel cell applications.

SUMMARY OF THE INVENTION

The present provides a MEA comprising a composite membrane structure having a porous polymeric matrix, ionically conductive solid dispersed in the polymeric matrix and an ionomeric binder, that is flanked by a anode and cathode catalytic layer. A preferred anode catalytic layer of the present invention comprises an oxidizing catalyst composition in intimate contact with carbon powder, an ionically conductive solid, and an ionomeric binder positioned to bind the ionically conductive solid to the oxidizing catalyst composition. A preferred cathode catalytic layer of the present invention comprises a reducing catalyst composition in intimate contact with carbon powder, an ionically conductive solid, and an ionomeric binder positioned to bind the ionicaly conductive solid to the reducing catalyst composition.

It has been unexpectedly found that the incorporation of effective amounts of an ionically conductive solid into both the cathode and anode layers, as well as the composite membrane structure, may greatly improve the overall performance of the MEA, in particular with regard to voltage drop across the assembly. It has further been unexpectedly found that the performance of a MEA comprising a PTFE membrane imbued with ionically conductive solids, can be greatly enhanced by heat treatment of the ionically conductive solid-imbued PTFE membrane. While not be bound thereby, applicants have hypothesized that such improvement is due to a marked reduction in cross-over.

Formulation of the oxidizing and reducing catalyst compositions found useful in the present invention is dependent on the type of oxidant utilized and fuel employed. For example, if hydrogen is used as a fuel, the catalyst composition should be active as a hydrogen oxidation catalyst (such as a 40 wt % platinum/ruthenium alloy supported on the surface of carbon powder), and if oxygen is used as the oxidizing agent on the cathode portion of the MEA, the cathode catalyst should be active as an oxygen reduction catalyst (such as platinum/chromium/cobalt alloy supported on the surface of carbon powder).

In one embodiment of the present invention there is disclosed a membrane electrode assembly (MEA) comprising: (a) a composite membrane having a first major surface area and a second major surface area comprising: (1) a membrane layer comprising an ionically conductive solid and an ionomeric binder; and (2) at least one protective layer disposed adjacent to the membrane layer comprising an an ionically conductive solid and ionomeric binder, and optionally hygroscopic fine powder; (b) an anode comprising an oxidizing catalyst adjacent said first major surface area of said composite membrane; and (c) a cathode comprising a reducing catalyst adjacent said second major surface area of said composite membrane.

In another embodiment of the present invention there is disclosed a membrane electrode assembly (MEA) comprising a composite membrane having a first major surface area and a second major surface area comprising:

1) a porous polymeric matrix containing ionically conductive solid and ionomeric binder;
2) at least one protective layer disposed adjacent to the porous polymeric matrix composite membrane comprising an ionomeric binder and an ionically conductive solid;

and an anode comprising an oxidizing catalyst adjacent said first major surface area of said composite membrane, and a cathode comprising a reducing catalyst adjacent said second major surface area of said composite membrane.

In another embodiment of the present invention there is disclosed a process for fabricating a MEA comprising: (a) obtaining a composite membrane having a first major surface area and a second major surface area comprising: (1) a porous polymeric matrix containing ionically conductive solid and an ionomeric binder, and (2) at least one protective layer disposed adjacent to the porous polymeric matrix composite membrane comprising an ionomeric binder and an ionically conductive solid; (b) spraying a mixture of oxidizing catalyst, ionomeric binder and ionically conductive solid in a solvent on said first major surface area; and (c) spraying a mixture of reducing catalyst, ionomeric binder and ionically conductive solid in a solvent on said second major surface area.

And in yet another embodiment of the present invention there is disclosed a process for fabricating a membrane electrode assembly (MEA) comprising: (a) obtaining a composite membrane having a first major surface area and a second major surface area comprising: (1) a membrane layer containing ionically conductive solid and an ionomeric binder, (2) at least one protective layer disposed adjacent to the membrane layer comprising an ionomeric binder and an ionically conductive solid, and optionally a hygroscopic fine powder; (b) spraying a mixture of oxidizing catalyst, ionomeric binder and ionically conductive solid in a solvent on said first major surface area; (c) spraying a mixture of reducing catalyst, ionomeric binder and ionically conductive solid in a solvent on said second major surface area.

And in yet another embodiment of the present invention there is disclosed a process for fabricating a MEA comprising: (a) obtaining a composite membrane having a first major surface area and a second major surface area comprising: (1) a porous polymeric matrix containing ionically conductive solid and an ionomeric binder, and (2) at least one protective layer disposed adjacent to the porous polymeric matrix composite membrane comprising an ionomeric binder and an ionically conductive solid; (b) applying a mixture of oxidizing catalyst, ionomeric binder and ionically conductive solid in a solvent on said first major surface area; and (c) applying a mixture of reducing catalyst, ionomeric binder and ionically conductive solid in a solvent on said second major surface area.

And yet in other process embodiment of the present invention there is disclosed a process of fabricating a membrane electrode assembly (MEA) comprising: (a). obtaining a membrane having a first major surface area and a second major surface area; (b) applying a solvent comprising an oxidizing catalyst, inomeric binder, and ionically conductive solid in a solvent of said first major surface area; and (c) applying a mixture of reducing catalyst, ionomeric binder, and ionically conductive solid on said second major surface area.

The above-discussed and other features and advantages of the present invention will be appreciated and understood by those skilled in the art from the following detailed description and drawings.

BRIEF DESCRIPTION OF THE DRAWINGS

FIG. I is a bar graph of the resistance of Teflon/Nafion® membranes before and after heat treatment.

DETAILED DESCRIPTION OF THE INVENTION

Figure 1:
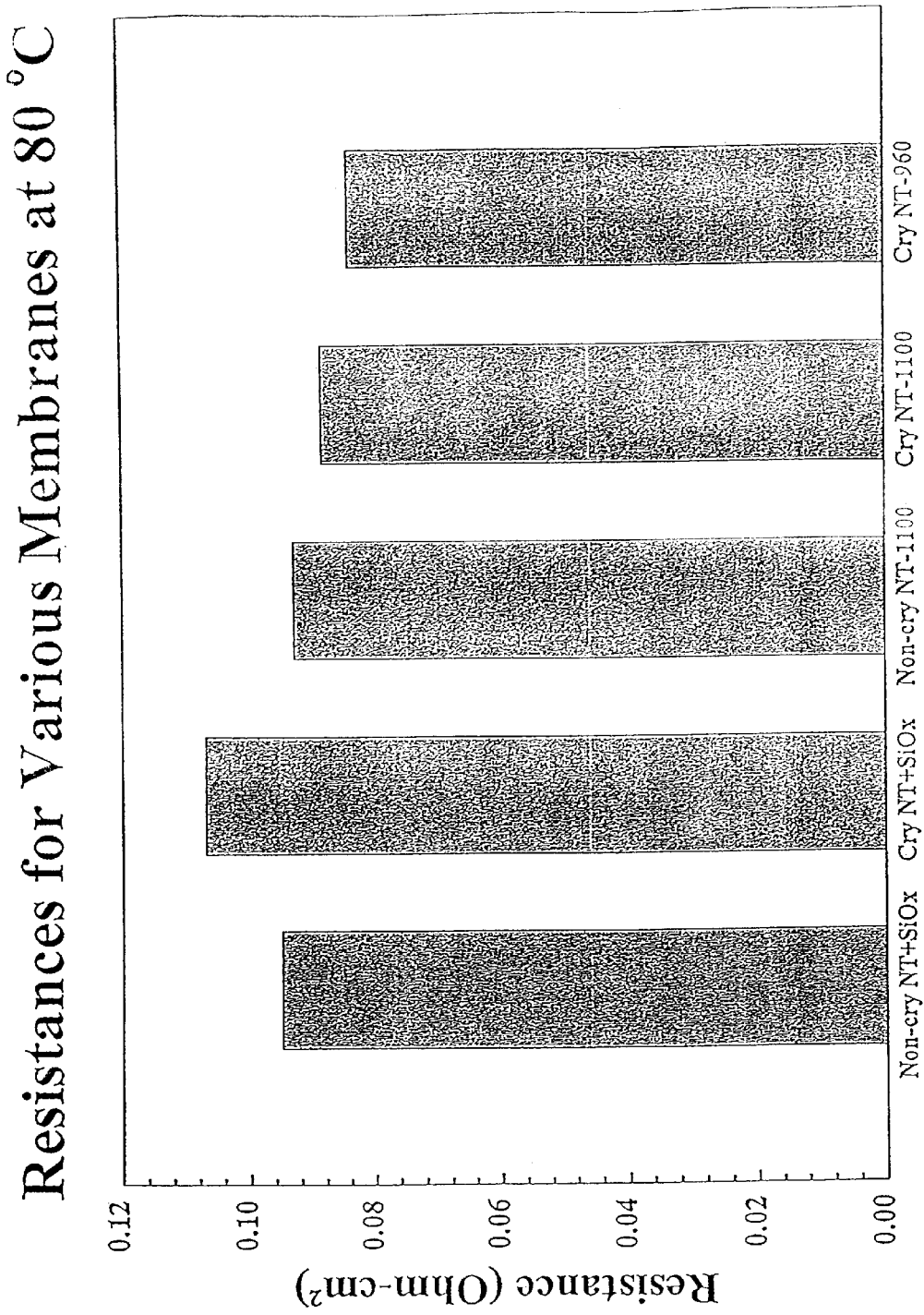

The present invention provides improved MEAs (membrane electrode assemblies) which may find employment in PEM (proton exchange membrane) fuel cells.

I. The Membrane Electrode Assembly

A membrane electrode assembly of the present invention comprise three main parts, the membrane, the anode catalyst layer and the cathode catalyst layer which are necessary for the production of useable electrochemical power. The membrane separates the anode from the cathode and provides a path between the same for ion exchange, thereby allowing current to be drawn from the assembly.

The membrane electrode assembly of the present invention can be fabricated using a number of different approaches. In one case the catalysts layers are bonded to the membrane using a combination of temperature, pressure, and perhaps an adhesive. This package is then placed between two porous substrates. The MEA and substrates are inserted between the cell separator plates to complete the entire cell. In another case, the catalyst layers are bonded to the porous substrates. These catalyst layer/substrate composites are then bonded to the membrane using a combination of temperature, pressure, and perhaps an adhesive. It has been discerned by the present inventors that MEA performance can be improved by spraying the anode and cathode catalyst layer onto the membrane surface rather than in pressing electrodes (such as E-TEK electrodes) onto the membrane itself.

Improved components of an MEA of the present invention, i.e., the membrane, anode, and cathode, are described in detail below:

A. The Membrane

In a preferred embodiment of the present invention the membrane comprises an ionically conductive solid and an ionomeric binder which preferably is ionically conductive as well. The membrane preferably also comprises a porous polymeric matrix. A membrane according to the present invention may be fabricated by casting a solution of ionically conductive solid and ionomeric binder to form a film. If a porous polymeric matrix is employed, the membrane may be fabricated by dispersing the ionically conductive solid into the matrix and incorporating an ionomeric binder into the matrix.

As disclosed in U.S. patent application Ser. No. 09/562, 235, through which priority is claimed in the present application to U.S. Provisional Application No. 60/132,038 (both references which are incorporated by reference in their entirety herein), improved performance of the MEA can be achieved when the membrane preferably comprises at least one protective layer disposed adjacent to the composite membrane, and more preferably at least one protective layer disposed adjacent to each side of the two major surface areas of the membrane to form a tri-layer membrane. Preferably the anode and cathode of the MEA are in intimate contact with the two protective layers. A protective layer preferably comprises ionomeric binder and ionically conductive solid, hygroscopic fine powder or a combination thereof. However, even pure ionomeric protective layers, such as Nafion®, without a ionically conductive solid incorporated therein, have been found to improve voltage drop across the membrane at low current densities. Cell resistance, however, may be excessive when pure ionomeric layers are used as the protective layers.

The tri-layer may also comprise protective layers of different composition. For example, the tri-layer membrane structure may comprise a center layer comprising ionomeric binder, porous polymeric matrix and ionically conductive solid, one protective layer comprising ionomeric binder and ionically conductive solid and one protective layer comprising ionomeric binder and fine powder. Optionally a noble metal is dispersed within the protective layer either in place of, or in addition to, the ionically conductive solid. The present inventors have determined that application of a pure ionomeric binder layer to the protective layers while reducing crossover, in general raises cell resistance to an excessive level, thereby reducing MEA performance rather than increasing performance.

It has also been determined by the present inventors that the performance of MEAs using membranes comprising ionically conductive solids in a polymeric matrix may be significantly improved by heat treating the solid-impregnated membrane. For solid-impregnated polytetrafluoroethylene ("PTFE") membranes (e.g., Teflon), improved performance of the MEA is noted when the membrane is heat treated at a temperature above about 100° C., more preferably above about 115° C., and more preferably at about 121° C., A preferred regimen for heat treating such PTFE membranes impregnated with ionically conductive solids is treat the membrane under a force of about 2000 lb. at 121° C. for at least about 10 minutes, more preferably at least about 20 minutes, prior to the application of the catalysts. As would be understood by the person of ordinary skill in the art, the particular temperature of optimal heat treatment, the length of the heat treatment, and the optimal pressure under which the heat treatment should be undertaken, will depend both upon the matrix and the ionically conductive solid employed in the membrane. The determination of such optimal parameters is believed to be well within the skill of the ordinary artisan given the present teachings.

In one embodiment, the composite membrane comprises a porous polymeric matrix (which is preferably non-cationically conductive), an ionically conductive solid dispersed within said matrix, and preferably, an ionomeric binder. These composite membranes may be prepared by first dissolving the ionomeric binder and the ionically conductive solid in an organic solvent. Suitable solvents include low molecular alcohols such as methanol, ethanol, and isopropanol, and any other inert organic solvents, which can dissolve both ionically conductive solids and ion exchange resins. The porous polymeric matrix is then impregnated with this mixture, and the impregnated membrane is then dried.

Impregnation of ionically conductive solid into porous polymeric matrix can vary depending on the materials. Thus, in an alternative preparation, the ionomeric binder alone is first dissolved in an organic solvent, and then impregnated with a second solution comprising the ionically conductive solid.

In another embodiment of the composite membrane, the membrane comprises an ionically conductive solid and an ionomeric binder. Such membranes are prepared by co-dissolving a suitable ionomeric binder and an ionically conductive solid, and casting the solution to form a film. The cast film is then dried. The resulting membrane can then be thermally treated.

The individual components of the membranes are described in detail below.

1. The Matrix

The matrix functions as a host and/or support for the ionically conductive solid dispersed therein. Suitable matrix materials are thin, possess a high porosity, fine pore size, and exhibit sufficient chemical and dimensional stability to allow fabrication and to function in their intended environments. The porous polymeric matrix may be cationically conductive, or essentially non-ionically conductive, so long as the materials have negligible electronic conductivity In particular, suitable matrix materials maintain physical and dimensional stability at high temperatures, preferably above 60° C., more preferably above about 90° C., and even more preferably up to about 250° C. Most preferably, the matrix maintains integrity at temperatures in the range form about 90° C. to about 200° C. The matrix material, or at least a portion of the matrix material, furthermore preferably maintains its integrity in oxidizing, reducing, acidic, and alkaline environments. Preferred matrix materials also have negligible electronic conductivity.

Materials suitable for use as matrices in the present membranes include, but are not limited to, polytetrafluoroethylene (PTFE) (e.g., Teflon® available form E.I. duPont de Nemours & Co.), polyvinylidene fluoride (PVDF), polyetheretherketone (PEEK), polyethersulfone (PES), perfluoroalkoxy (PFA), fluorinated ethylene propylene (FEP), polybenzimidazole, polyethersulfone, sulfonated polyetheretherketone, poly(phenylene oxide), polyaniline, polystyrene oxide, poly(methacrylate), and copolymers and mixtures thereof. The polymer matrix preferably has a melting point in the range from about 100° C. to about 300° C.

The matrix is preferably as thin as possible to facilitate impregnation of ion exchange materials (i.e., ionically conductive solid), and ionomeric binder (when present), while still providing sufficient strength to the membrane for fuel cell applications. Preferred matrix thicknesses are in the range from about 0.25 mil to less than about 4 mil. Preferably, the thickness of the matrix is in the range from about 0.5 mil to about 3 mil, and most preferably, in the range from about 0.5 mil (0.00.127 cm) to about 1.5 mil (0.0038 cm).

In addition to reduced thickness, it is preferred that the matrix possess high porosity (preferably the pores encompassing not less than about 40% of the surface area and being approximately evenly distributed along the surface) and extremely fine pore size (preferably the maximum dimension of a pore is less than about 1 $\mu$m). The combination of thinness, high porosity and fine pore size is important, as membranes having thick host matrices with large pores behave like pure ion exchange membranes when impregnated with ion exchange material. The present pore size is preferably selected to be as fine as possible while being large enough to accept the ionically conductive solid into the matrix pores. For example, when Nafion® is utilized as the ionomeric binder, the pore size of the host matrix should be larger than about 0.02 $\mu$m (micron), i.e., the size of the polymer. Preferably, the present matrix has pores possessing a maximum dimension in the range from about 0.025 $\mu$m to about 1 $\mu$m, and most preferably from about 0.025 $\mu$m to about 0.2 $\mu$m. The matrix porosity is preferably in the range of from about 40% to about 95% of the total surface area, more preferably, from about 60% to about 90%.

2. The Ionically Conductive Solid

It is believed that the ionically conductive solid serves to impart and/or enhance conductivity of the membranes. As defined herein, "solid" means a material that is solid at fuel cell fabrication and operating temperatures.

It is preferred that the ionically conductive solid possess no unbound water, such that when operating as a membrane in a fuel cell, the vapor in the fuel stream is unsaturated at the operating temperature.

Preferred ionically conductive solids have ionic high conductivity, preferably in the range from about $10^{-4}$ per ohm per centimeter ($\Omega^{-1}$) to about 0.2 $\Omega^{-1}$ $cm^1$, more preferably; from about $10^{-2}$ $\Omega^{-1}$ $cm^{-1}$ to about 0.2 $\Omega$–1 $cm^{-1}$, and most preferably from about 0.1 $\Omega^{-1}$ $cm^{-1}$.

The ionically conductive solid may be prepared by reaction in situ or premade and then impregnated into the porous polymeric matrix, depending on the material used. The ionically conductive solid and, when present, preferable ionomeric binder material, are substantially impregnated into the porous structure of the membrane in order to render an interior volume of the membrane occlusive.

Examples of preferred ionically conductive solids include, but are not limited to, polyoxymetalates, and heteropoly acids such as phosphotungstic acid, phosphomolybdic acid, silicotungstic acid, phosphosolicic acid, zirconium hydrogen phosphate, and zeolites. Heteropoly acids are particularly preferred, being proton conductive solids having conductivities of up to about 0.17 $\Omega^{-1}$ $cm^{-1}$ $^{at}$ 25° C. Phosphotungstic acid, for example, in its hydrate from $(H_3PO_4(WO_3)_{12}\cdot nH_2O)$ has an ionic conductivity of about 0.17 $\Omega^{-1}$ $cm^{-1}$. Since the conductivity of heteropoly acids is due to the hydrated water, an ion exchange composite membrane containing a heteropoly acid is expected to have higher conductivity than an ion exchange composite membrane without heteropoly acid, because the interaction between water and solid acid should be stronger than the interaction between ion exchange resin and water, resulting in an improved ability to retain water. The addition of heteropoly acids not only creates more acid sites for proton transfer, but also provides the water for the ion exchange resin at elevated temperature. Other interactions between heteropoly acids and Nafion® have been described by Lin, et al., in "High Temperature Nafion®—based Composite Membranes for Hydrogen PEM Fuel Cell", which is incorporated by reference herein in its entirety.

3. The Ionomeric Binder

An ionomeric binder is preferably present in the composite membrane. The ionomeric binder is believed to aid in preventing fuel crossover and to enhance proton conductivity. Suitable ionomeric binders for use in the present membranes may be any chemically and electrochemically stable ion exchange resins or other polymers with high ionic conductivity.

Examples of preferred ionomeric binders include, but are not limited to, ion exchange resins such as Nafion®, other perfluorinated sulfonic acids, polystyrene sulfonic acid, and perfluorinated carboxylic acid resins. Other polymetric acid resins, which form polymers, may also be used.

The ratio of ionomeric binder, when present, to ionically conductive solid should adjusted to as to provide optimal physical, chemical, and electrical characteristics. Composite membranes having too high a ratio of ionomeric binder to ionically conductive solid do not have high conductivity at elevated temperature. Conversely, composite membranes having too low a ratio of ionomeric binder to ionically conductive solid will result in a membrane with increased rates of fuel crossover. When the ionomeric binder is present, the ratio of ionomeric binder mass to ionically conductive solid mass is in the range from 1:5 to 5:1.

B. The Anode Catalyst Layer

As would be understood by one of ordinary skill in the art, the form of the anode depends on the type of fuel to be used. If a mixture of hydrogen, carbon dioxide, water, and carbon monoxide from a steam reformed hydrocarbon is used, the anode catalyst should preferentially be very active as a hydrogen oxidation catalyst and be tolerant to the presence of carbon monoxide that poisons many catalysts. Since such a catalyst is most likely a precious metal, it should be supported on a high surface area electronically conductive material to enhance its surface area and effectiveness per unit of cost. The concentration of the catalyst on the support should be an optimum since a high concentration tends to reduce the surface area whereas a low concentration tends to thicken the anode. A thick anode restricts the ability of ions and reactants to migrate through the anode to the surface of the catalyst. An example of such an anode catalyst is a 40 wt % platinum/ruthenium alloy supported on the surface of a carbon powder such as Vulcan XC-72 produced by the Cabot Corporation.

It has been discovered that in order to provide improved MEA performance, good ionic conductivity should be maintained within the anode. The present inventors have discovered that performance of the MEA can be significantly enhanced when the electrolyte within the anode incorporates the features as described for the membrane by using a mixture of ionically conductive solid and ionomeric binder in an optimal ratio. It has been unexpectedly found that the ratio of ionically conductive solid to ionomeric binder in the anode is of significant importance, with too high ratios leading to adsorption of the ionically conductive solid onto the catalyst supports (impairing the catalyst and electronic conductivity), and too low ratios resulting in an poor electrolyte ionic conductivity.

C. The Cathode Catalyst Layer As would also be understood by one of ordinary skill in the art, the form of the cathode depends. on the type of oxidant to be used. For example, if air is used, the cathode catalyst should preferentially. be very active as an oxygen reduction catalyst and be stable in the highly corrosive environment of the cathode. Since such a catalyst is most likely a precious metal, it should be supported on a high surface area conductive material to enhance its surface area and effectiveness per unit of cost. The concentration of the catalyst on the support should be an optimum since a high concentration tends to reduce the surface area whereas a low concentration tends to thicken the cathode. A thick cathode restricts the ability of ions and reactants to migrate through the cathode to the surface of the catalyst. An example of such a cathode catalyst is a 60 wt % platinum/chromium/cobalt alloy supported on the surface of a carbon powder such as Vulcan XC-72 produced by the Cabot Corporation.

As with the anode, it has been discovered that in order to provide improved MEA performance, good ionic conductivity should be maintained within the cathode. The present inventors have discovered that performance of the MEA can be significantly enhanced when the electrolyte within the cathode incorporates the features as described for the membrane by using a mixture of ionically conductive solid and ionomeric binder in an optimal ratio.

As with the anode, it also unexpectedly has been found that the ratio of ionically conductive solid to ionomeric binder in the cathode is of significant importance, with too high ratios leading to adsorption of the ionically conductive solid onto the catalyst supports (impairing the catalyst and electronic conductivity), and too low ratios resulting in an poor electrolyte ionic conductivity.

The performance of an MEA cell has further been found to be optimized by maximizing the catalyst surface area of the cathode utilized and in improving the ionic conductivity of the catalyst layer. Application of a catalyst layer onto the cathode-side membrane surface has also been found to increase MEA performance, presumably by reducing the path length for ionic conduction. For example, the coating of a platinum black layer onto a membrane containing Nafion® 960 with phosphotungstic acid, followed by coating the platinum black layer with a Pt/Vulcan catalyst layer containing Nafion®,was found to produce increased cathode catalyst activity.

EXAMPLE 1

Improved Performance of MEAs with Heat Treatment of the Membrane

A study was undertaken to determine whether heat treatment of the membrane would improve performance of a MEA by reducing resistance and crossover.

Five membranes were prepared using Tetratec® (Tetratec Co., Fosterville, Pa) Teflon® membranes filled with various electrolytes. These electrolytes were:

1100 Equivalent Weight ("EW") Nafion®,

960 EW Nafion®,

1100 EW Nafion® containing 3 wt % silica

The membranes were prepared as trilayers and either sprayed with catalyst layers without heat treatment or were heated under a force of 2000 lb. (6.8 cm$^2$ area) at 121° C. for 20 minutes prior to the application of the catalyst layers. In all cases, the electrolyte in the electrodes was the same as that in the membrane but with the absence of the silica. The MEAs were not heat treated after the application of the catalyst layers.

FIG. 1 is a graph illustrating the resistance of untreated and heat-treated Teflon/ Nafion® membranes using saturated reactants at 80° C. All of the resistances can be seen to be good with the pure heat-treated 960 EW Nafion® being the lowest followed by the pure heat-treated 1100 EW Nafion®. Since the heat treatment is thought to introduce some crystallinity into the Nafion®, the heat-treated samples are labeled as crystalline (e.g., heat treated Nafion®/Teflon is denoted "Cry NT").

Figure 2:
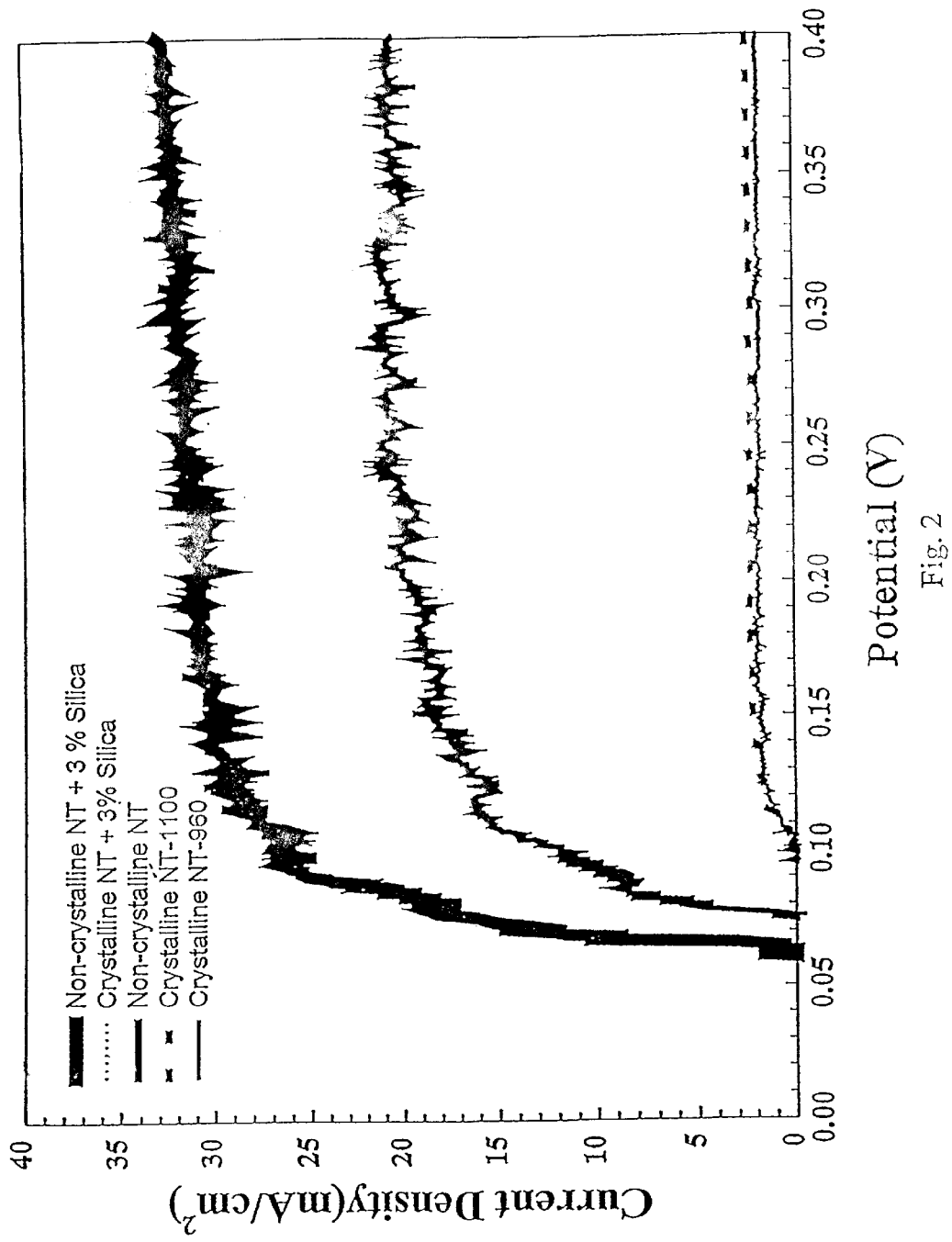
FIG. 2 is a graph of fuel (hydrogen) cross-over in a MEA having a Teflon/ Nafion® membrane, both before and after heat treatment of the membrane.

FIG. 2 is a graph that illustrates that heat-treatment of a Teflon/Nafion® membrane significantly reduces fuel (hydrogen) crossover (as adjudged by crossover current) in a MEA. While all of the heat-treated membranes showed crossover current at 80° C. of about 2 ma/cm$^2$, the value was much higher for the membranes that had not been heat-treated.

It may be concluded from this experiment, that heat treating a membrane imparts a reduction in fuel crossover, and a subsequent improvement in MEA performance.

EXAMPLE 2

Reduction of Path Length for Ionic Conduction by Use of Platinum Black Layer

A study was undertaken to determine whether performance of the MEA could be enhanced by reduction of the path length for ionic conduction in the cathode. A platinum black layer on the cathode-side membrane surface was applied in an attempt to reduce the path length for ionic conduction.

A polytetrafluoroethylene membrane support was imbued with Nafion® 960 and PTA in an additive weight ratio of 1 part PTA to 4 parts Nafione® 960, to form an imbued membrane support having a total thickness of 0.6 mils. Nafion® was then applied along the two major surfaces of the imbued membrane support to form two protective layers of thickness 2 mils and a tri-layer composite membrane. Because of the difficulty of adding phosphotungstic acid to the cathode catalyst layer to enhance its conductivity at high temperature, a layer containing only platinum and Nafion® 960 was first sprayed onto the tri-layer composite membrane on the cathode side to give a metal loading of about 0.4 mg.cm$^2$. A 40 wt % Pt/Vulcan catalyst layer containing Nafion® alone was then applied over the platinum black layer. The anode catalyst layer was applied to the other major surface of the tri-layer composite membrane by spraying a Pt-Ru/C: Nafion® 960 mix in methanol onto the surface. The ratio of 45 wt % Pt/Ru on carbon (Vulcan XC-72) to Nafion® 960 was 3:1 by weight. Metal loading at the anode catalyst layer was about 0.4 mg/cm$^2$. Ultrasonic dispersion of the anode catalyst was performed (80 mg Pt-Ru/C in 2.4 g methanol) for 3 hours.

Figure 3:
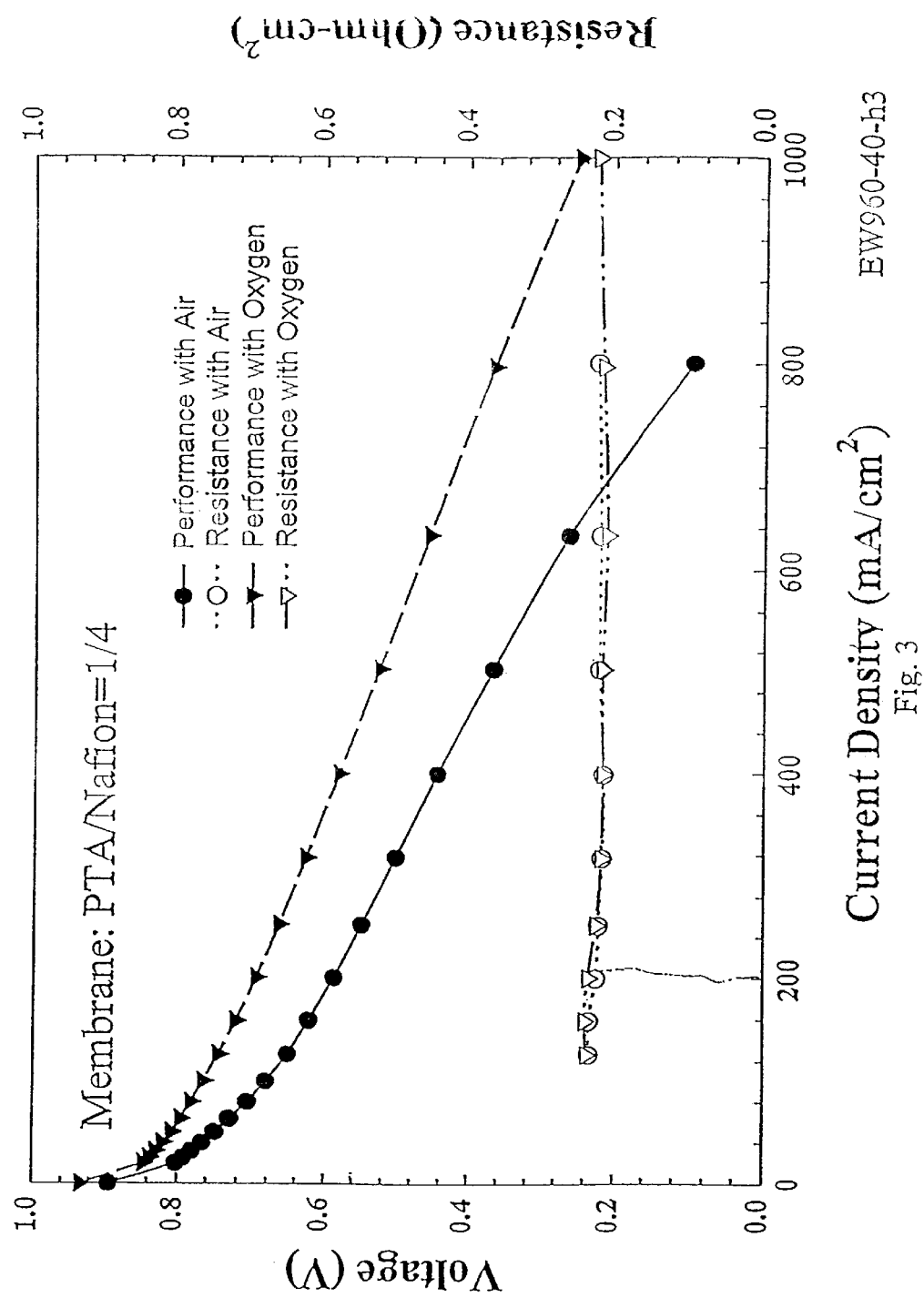
FIG. 3 illustrates the performance and internal resistance of a MEA having a Nafion®/PTA-imbued Teflon® membrane coated along its major surface areas with a layer of Nafion®, an anode comprising Pt-Ru/C: Nafion®, and a cathode comprising a platinum black/ Nafion® layer and a Pt/Vulcan catalyst layer.

The performance and internal resistance of this cell at atmospheric pressure and 120° C. using hydrogen as the fuel, and air or oxygen as the oxidant, are shown in FIG. 3. The cell voltage at 400 ma/cm$^2$ and 120° C. was very good at about 0.45 volts on air with a cell resistance of about 0.2 Ωcm$^2$.

Figure 4:
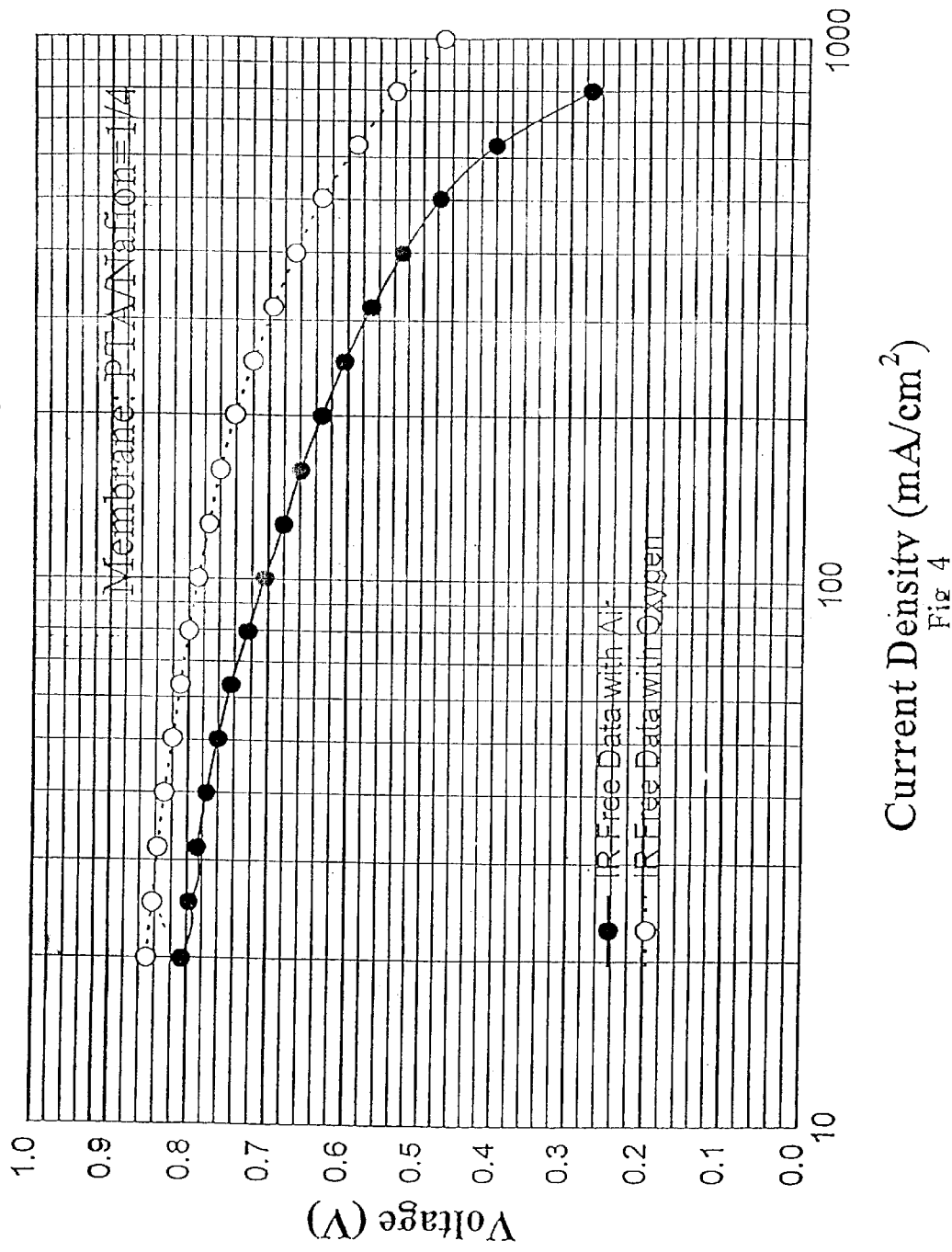
FIG. 4 is a graph of the internal resistance-free (IR-free) performance data of the MEA of FIG. 3.

The IR-free performance data are shown in FIG. 4. The semilogarithmic slope of voltage versus current on oxygen (Tafel slope) was about 85 mv/decade between 20 and 80 ma/cm$^2$, lower than anticipated without the platinum black layer. A reaction controlled Tafel slope of 78 mv/decade would be expected if the Tafel slope equals 2.3 RT/F (R=gas constant, T=temperature, and F=Faraday constant), based on the anticipated rate-determining step for the oxygen reduction reaction.

As depicted in FIG. 4, the current ratio between the performance on air and oxygen was below 4.8:1 (expected for a first order process with oxygen) at all current densities, going from 3.5:1 to 2.5:1 for air current densities of 20 ma/cm$^2$ and 200 ma/cm$^2$, respectively. This may be interpreted as suggesting that either ionic conductance is still poor within the cathode catalyst layer or that the performance of the cell was changing with time between the times at which the air and oxygen data were obtained. Some ionic resistance is probably present.

As a measure of cathode catalyst activity, the current in FIG. 4 at 0.8 volts on oxygen was about 80 ma/cm$^2$. This compares to 26 ma/cm$^2$ for a similar cell that had no platinum black layer. This ratio of activities would be expected to increase the performance by 38 mv assuming an activation Tafel slope of 78 mv/decade. The cell voltage of a similar cell with no platinum black layer was 0.41 volts at 400 ma/cm$^2$ and is just about 38 mv below the 0.45 volts of the present cell. The performance increase is deemed to be due primarily to the increase in cathode catalyst activity.

Figure 5:
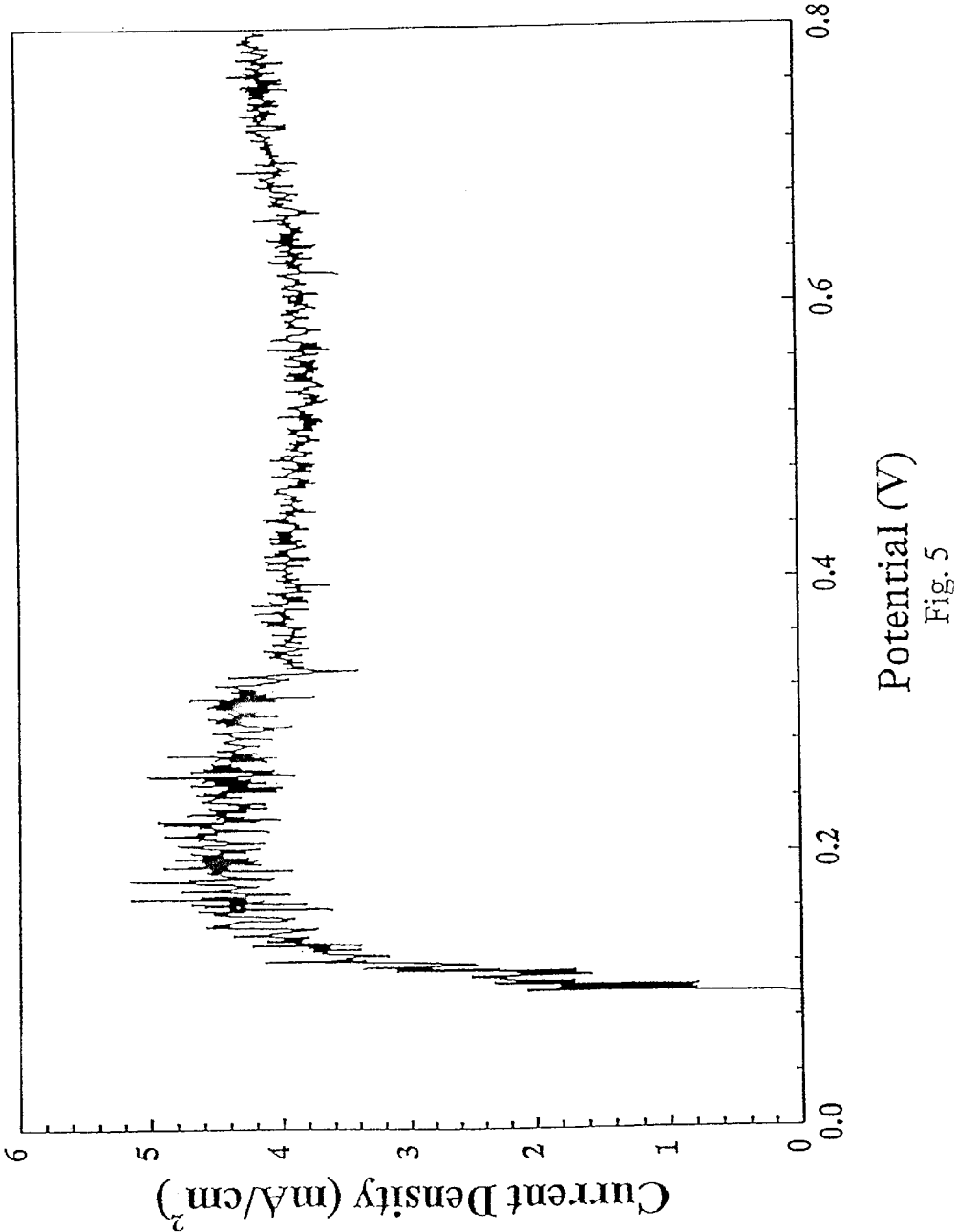
FIG. 5 is a graph of the fuel (hydrogen) cross-over of the MEA of FIG. 3.

As seen in FIG. 5, fuel (hydrogen) crossover current of the cell was fairly low at about 4 ma/cm$^2$ of hydrogen at 111° C. Voltammetry results (down to 0.1 volts) on the cathode, also depicted in FIG. 5, results in a platinum area of about 821 cm$^2$. The similar area for cell without a platinum black layer is about 195 cm$^2$. The ratio of these numbers is 4.2 that is close to the ratio of currents at 0.8 volts of 80/26=3.1. This agreement supports the conclusion that the improved performance is due to increased cathode catalyst activity.

The. results demonstrate that the introduction of a platinum black layer on the cathode-side membrane surface is effective in increasing cell performance.

EXAMPLE 3

Fabrication of an Membrane Electrode Assembly Comprising PTA in the Membrane and Pressed Catalytic Electrodes with PTA A membrane (containing a porous Teflon® support, phosphotungstic acid and EW=960 Nafion®) was prepared as follows: A 5% Nafion® solution was evaporated to dryness and re-dissolved in an equivalent amount of ethanol to obtain a 5% Nafion® solution in ethanol. 0.5 g of phosphotungstic acid (PTA) was dissolved in 15 g of methanol to obtain a solution. The 5% Nafion® solution (10 g) and the PTA solution (15 g) were then combined to obtain a solution with 1:1 weight ratio of PTA to Nafion®. The porous polymeric matrix was mounted in a holder. The PTA/Nafion® solution. was applied to both sides. of the matrix by brush to form a composite membrane. The membrane was then dried at 60° C. for 5 minutes to remove any solvent. The composite membrane was then mounted vertically, kept warm using a heat lamp, and sprayed with PTA/ Nafion® solution on both sides until the total weight of the composite membrane (Nafion®-Teflon-Phosphotungsic Acid ("NTPA") was about 0.25 g/70cm$^2$. The composite membrane was then heat pressed at 120° C. under 10$^6$ Pa for 20 minutes.

The resulting membrane was subsequently used to fabricate the membrane electrode assembly (MEA). Commercial electrodes with 0.4 mg/cm$^2$ (total metal) of 20% Pt/C (cathode) and 20% Pt-Ru/C (1:1 atomic ratio) (anode) obtained from E-Tek company were first impregnated by Nafion® solution (EW=960) blended with phosphotungstic acid and then dried in an oven at 80° C. for 10 minutes. The ratio for dry Nafione to phosphotungstic was 2:1 by weight. 1.0 mg/cm$^2$ Nafion® loading in the electrodes was obtained after impregnation.

To obtain intimate contact between membrane and electrodes, a thin layer of concentrated Nafion® solution was applied to the Pt (cathode) and Pt-Ru (anode) electrodes, respectively. Before the Nafion® solution dried, the two electrodes were placed on opposite sides of the membrane, pressed within two Teflon® films+silicon rubber sheet gasket+metal plates and then heated in an oven at 120° C. for 20 minutes with a 5 kg weight (6.8 cm$^2$ area) pressing down on the top metal plate.

Figure 6:
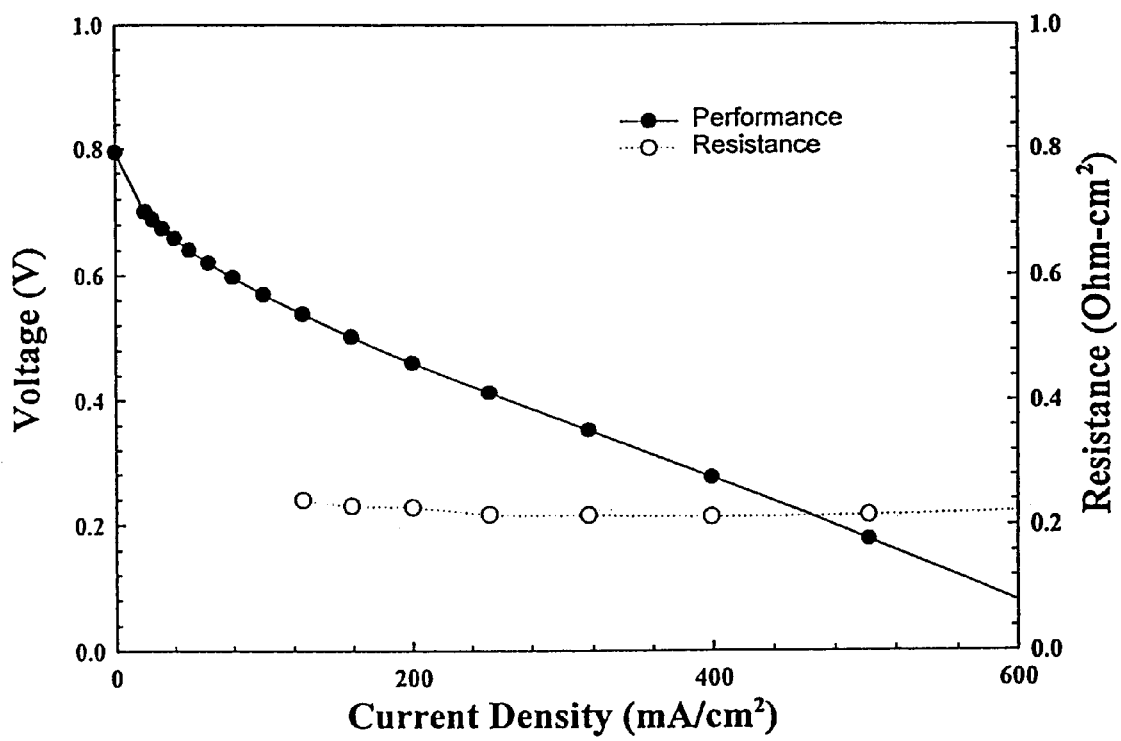
FIG. 6 is a graph depicting the voltage/resistance across a MEA comprising a membrane comprising a porous Teflon matrix impregnated with phosphotungstic acid and Nafion®, and pressed commercial E-tek® catalyst electrodes with 0.4 mg/cm$^2$ (total metal) of 20% Pt/C (cathode) and. 20% Pt-Ru/C (1:1 atomic ratio) (anode), for select current densities.

The resulting MEA was tested in a 5 cm$^2$ single cell obtained from Electrochem Inc. The performance of MEA-A, a MEA made as described in this example, at 120° C. is shown in FIG. 6. The water saturation temperatures and the stoichiometric flow rates of the hydrogen and air are specified in the caption of FIG. 6.

EXAMPLE 4

Fabrication of an Membrane Electrode Assembly Comprising PTA in the Membrane and Catalytic Electrodes Layers with PTA Sprayed on the Membrane A membrane (containing a porous Teflon® support, phosphotungstic acid and EW=1100 Nafion®) prepared as described was used to fabricate the membrane electrode assembly (MEA). Nafion®—bonded catalysts were prepared by mixing Nafion® solution (EW=1100) with catalyst, stirring, sonifying and then drying in a convention oven to remove the solvent. Nafion® and PTA loadings for the 60% Pt/C (E-Tek) cathode catalysts and 45% Pt-Ru/C (Johnson Matthey) anode catalysts were 15% by weight and 25% by weight, respectively. The resulting catalysts were re-dispersed by methanol. The concentration of the catalyst solutions was about 3%. The MEA was prepared by spraying the catalysts on each side of the membrane using nitrogen gas.

Figure 7:
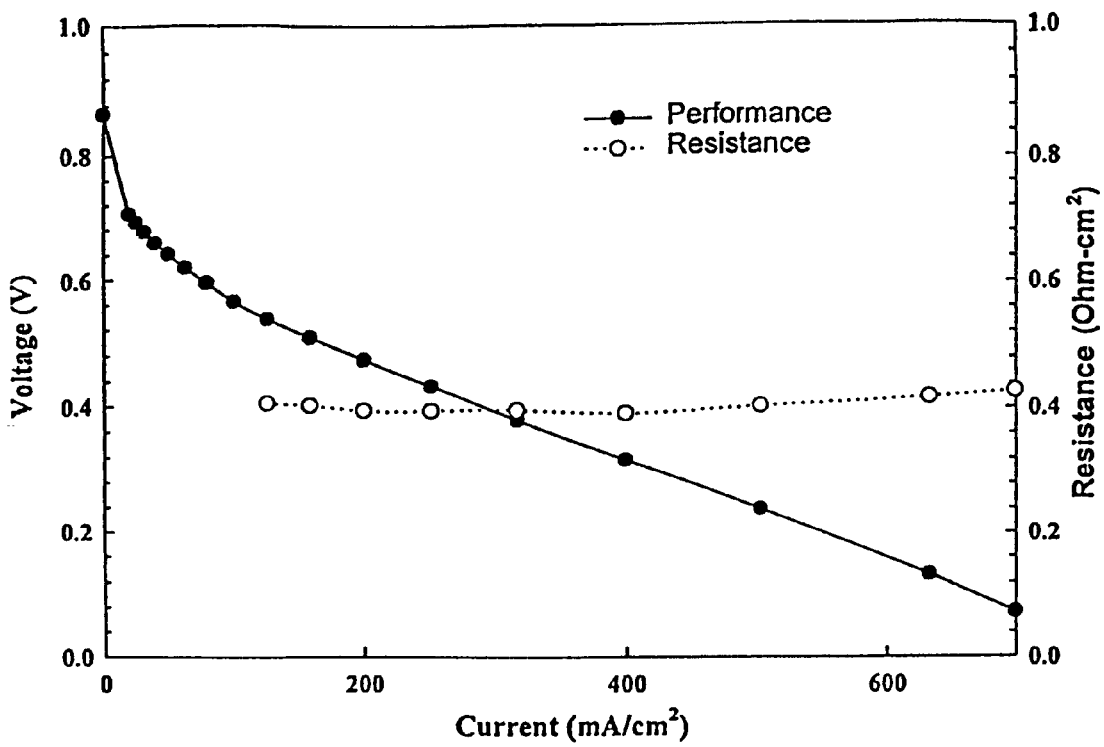
FIG. 7 is a graph depicting the voltage/resistance across a MEA comprising a membrane comprising a porous Teflon matrix impregnated with phosphotungstic acid and Nafion® and catalytic electrodes, comprising 60% Pt/C (cathode) or 45% Pt-Ru/C (anode) and Nafion®, sprayed onto the each of the two major surfaces of the membrane, for select current densities.

The performance of this MEA-S is shown in FIG. 7. The water saturation temperatures and the stoichiometric flow-rates of the hydrogen and air are specified in the caption of FIG. 7.

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety.

What is claimed is:

1. A process for fabricating a membrane electrode assembly (MEA) comprising:

a) obtaining a composite membrane having a first major surface area and a second major surface area comprising:
      1) membrane layer containing ionically conductive solid and an ionomeric binder;
      2) at least one protective layer disposed adjacent to the membrane layer comprising an ionomeric binder and an ionically conductive solid, and optionally a hygroscopic fine powder;

b) applying a mixture of oxidizing catalyst, ionomeric binder and ionically conductive solid in a solvent on said first major surface area;

c) applying a mixture of reducing catalyst, ionomeric binder and ionically conductive solid in a solvent on said second major surface area.

2. The process of claim 1 wherein the membrane layer of step (a)(1) comprises a porous polymeric matrix.

3. The process of claim 1, wherein the composite membrane of step a) is heat treated from at least about 10 to about 20 minutes at a temperature above 100° C. prior to steps b) and c).

4. The process of claim 1, wherein the composite membrane of step a) is heat treated from at least about 10 to about 20 minutes at a temperature above about 120° C. prior to steps b) and c).

5. The process of claim 1 wherein the application of the mixture of oxidizing catalyst is performed by coating, transferring screen printing, brushing, curtain coating, or drip coating.

6. The process of claim 1 wherein the application of the mixture of reducing catalyst is performed by coating, transferring screen printing, brushing, curtain coating, or drip coating.

* * * * *